Patented Jan. 14, 1941

2,228,567

UNITED STATES PATENT OFFICE 2,228,567

RESINOUS COMPOSITION

Hans John, Appleton, Wis., assignor to Paper Patents Company, Neenah, Wis., a corporation of Wisconsin No Drawing. Application September 3, 1938, Serial No. 228,399

17 Claims. (Cl. 260—72)

The present invention relates to compositions of matter exhibiting properties found in synthetic resins and includes an improved process for obtaining said compositions. The ingredient or ingredients making up the principal part or parts of the compositions of the present invention are obtained from dilute waste sulphite liquor, and preferably from the spent or waste liquor as drained from the pulp in the sulphite pulping process.

In the "sulphite process" for the production of chemical wood pulp, the reagents used in the cooking liquor for the decomposition of the wood comprise ordinarily a water solution of sulphur dioxide and, in addition, some alkaline earth or alkali metal or ammonium salt of sulphur dioxide usually in the form of bisulphite such as calcium bisulphite. The disposal of the waste liquor remaining from this process after recovery of the cellulose per se for use in the manufacture of paper has long been a major problem in the paper industry. Prior suggestions calling for the evaporation of the liquors and the disposal of the solid residue have been found economically impractical due to prohibitive cost.

The art has known for some time that spent liquors from the sulphite process contain various compositions including potential resinous compositions, which have commercial value. Suggestions by prior investigators for recovering the resinous compositions by concentration of the sulphite liquor have, as indicated above, been found commercially impractical. Other attempts by the art to separate the resinous compositions by chemical precipitation have also been rejected for the most part by the paper industry due primarily to high cost and the difficulty encountered in the separation of the precipitate from the liquor. As far as I have been able to ascertain, no one has heretofore suggested a practical method of obtaining resinous compositions from sulphite liquor.

Therefore, one of the principal objects of the present invention is to provide a process for recovering resinous compositions from sulphite liquors readily adaptable for commercial application.

Another object of the present invention is to provide novel compositions possessing properties present in synthetic resins.

Other objects will be apparent from the following detailed description.

I have discovered that resinous compositions may be recovered by a precipitation process from dilute spent sulphite pulping liquors by mixing with the sulphite liquor an amine and an aldehyde in the presence of a strong acid. I have also discovered that the precipitates obtained by the above process are readily separable from the liquor, exhibit properties found in synthetic resins and are adaptable for use in molding compositions.

The processes of the present invention employ dilute spent or waste sulphite liquors having a concentration of solids up to approximately 45 percent. Investigations have shown concentrated sulphite liquors i. e. liquors having a solid content above 45 per cent, to be unsatisfactory. For example, when using concentrated liquors the heat of reaction drives off large amounts of volatile aldehyde, e. g. formaldehyde, and the precipitate which cakes in the concentrated liquors makes mixing very difficult and the preparation of uniform reaction products practically impossible. Also the precipitates obtained from concentrated liquors have been found in many cases to be incompletely resinified, hygroscopic and highly corrosive. In addition, molded products made from precipitates obtained from concentrated liquors have been found to be poor in strength, brittle and easily fractured, to have a tendency to char and to have a poor surface due to gas pits.

Preferably the processes of the present invention utilize spent liquor as it comes from the sulphite digesters in which the liquor has a concentration of solids of about 10 to 15 percent. When using the dilute liquors of the present invention the loss of volatile aldehyde is prevented and the resulting products are uniform or homogeneous. The precipitates obtained from dilute liquors are substantially free from occluded water soluble materials and are free from the undesirable properties found to be present in products obtained from concentrated liquors. In view of the above the term "dilute" liquor occurring throughout the present specification and claims is intended to cover spent or waste sulphite liquors having a concentration of solids of 45 percent or less.

The following examples will serve to illustrate the present invention:

EXAMPLE I

To 1000 c. c. of dilute spent acid sulphite liquor preferably stirred by an agitator is added 20–25 grams of aniline. The resulting clear solution assumes a coloration that can be likened to that of choke cherry juice. About 25–35 grams of commercial 40 percent formaldehyde solution (formalin) are next added to the agitated mixture followed by the addition of 10–15 c. c. of 1: 1 sulfuric acid, i. e. 1 volume of concentrated sulfuric acid (sp. gr. 1.84) mixed with 1 volume of water. The temperature of the reaction mixture is preferably maintained at an elevated temperature of at least 50° C. which is sufficient to produce a heavy reddish-yellow precipitate in less than 1 minute after the addition of the final ingredient. The precipitate is readily separated by filtration and is washed with water in the usual manner. My investigations have shown the precipitates obtained when the reaction mixture is maintained at 70°-90° C. to have an astonishingly high rate of drainage, in fact so rapid that the rate is comparable to that of an aqueous suspension of sea sand, no suction being required during washing on the filter. Precipitation at ordinary or room temperatures requires about 2 minutes and the precipitates obtained filter at a slower rate than those obtained at temperatures of at least 50° C. In some cases precipitation under heat and pressure have been found desirable.

EXAMPLE II

To 1000 c. c. of a vigorously agitated dilute spent acid sulphite liquor solution about 25 grams of aniline are added, followed by the addition of 15 c. c. of 1:1 sulfuric acid and 15 grams of formalin. The mixture in which a yellowish precipitate is forming is stirred for about 15 minutes and then 25 grams of furfural are progressively added in small portions. The addition of the furfural causes the precipitate to assume a dark red color and increase greatly in particle size. The precipitate obtained at ordinary temperatures in accordance with this example exhibits an astonishing rate of settling after agitation is discontinued. My investigations show that the precipitate when formed at high temperatures has a strong tendency, when agitation is stopped, to coalesce and form a coherent resinous substratum which is readily separable from the liquor. This precipitate should also be washed in the usual manner.

The preferred materials for use in the present invention include primary aromatic amines such as aniline, toluidine, xylidine, phenylene diamine, toluylene diamine, benzidine, tolidine and naphthylamine, and aldehydes such as formaldehyde, acetaldehyde and furfural. Other types of amines and aldehydes may be used if desired but I have found the materials listed above to be particularly adaptable for use with spent sulphite liquors for commercial application. Any strong acid may be used in the process of the present invention, although it is ordinarily preferred to use a mineral acid such as sulphuric, hydrochloric, etc.

The following additional examples in which the reaction is carried out in accordance with the process of Examples I or II, will serve for illustrative purposes.

EXAMPLE III

*Formaldehyde reaction products*

(a) Dilute waste sulphite liquor
　　　　　　　　　　cubic centimeters__ 1000
　Aniline _____grams__ 25
　H₂SO₄ (1:1)_____cubic centimeters__ 15
　Formalin _____grams__ 20.1
(b) Dilute waste sulphite liquor
　　　　　　　　　　cubic centimeters__ 1000
　Aniline _____grams__ 25
　H₂SO₄ (1:1)_____cubic centimeters__ 22.5
　Formalin _____grams__ 10.1
(c) Dilute waste sulphite liquor
　　　　　　　　　　cubic centimeters__ 1000
　Aniline _____grams__ 25
　H₂SO₄ (1:1)_____cubic centimeters__ 45.0
　Formalin _____grams__ 40.3
(d) Dilute waste sulphite liquor
　　　　　　　　　　cubic centimeters__ 1000
　o-Toluidine _____grams__ 21.4
　Formalin _____do___ 15.0
　H₂SO₄ (1:1)_____cubic centimeters__ 15.0
(e) Dilute waste sulphite liquor
　　　　　　　　　　cubic centimeters__ 1000
　Para toluidine_____grams__ 21.4
　Formalin _____do___ 15.0
　H₂SO₄ (1:1)_____cubic centimeters__ 15.0
(f) Dilute waste sulphite liquor
　　　　　　　　　　cubic centimeters__ 1000
　Xylidine _____grams__ 24.2
　Formalin _____do___ 15.0
　Conc. HCl_____cubic centimeters   20.0
(g) Dilute waste sulphite liquor
　　　　　　　　　　cubic centimeters__ 1000
　m-Phenylenediamine _____grams__ 21.6
　Formalin _____do___ 30.0
　Conc. HCl_____cubic centimeters   20.0
(h) Dilute waste sulphite liquor
　　　　　　　　　　cubic centimeters__ 1000
　Para phenylenediamine_____grams__ 21.6
　Formalin _____do___ 30.0
　Conc. HCl_____cubic centimeters   20.0
(i) Dilute waste sulphite liquor
　　　　　　　　　　cubic centimeters__ 1000
　2, 4 toluylenediamine_____grams__ 24.4
　Formalin _____do___ 30.0
　Conc. HCl_____cubic centimeters   20.0
(j) Dilute waste sulphite liquor
　　　　　　　　　　cubic centimeters__ 1000
　Benzidine _____grams__ 18.4
　Formalin _____do___ 15.0
　Conc. HCl_____cubic centimeters   20.0
(k) Dilute waste sulphite liquor
　　　　　　　　　　cubic centimeters__ 1000
　o-Toluidine _____grams__ 21.2
　Formalin _____do___ 15.0
　Conc. HCl_____cubic centimeters   20.0
(l) Dilute waste sulphite liquor
　　　　　　　　　　cubic centimeters__ 1000
　α-naphthylamine _____grams__ 28.6
　Formalin _____do___ 15.0
　Conc. HCl_____cubic centimeters   20.0

EXAMPLE IV

*Acetaldehyde reaction products*

(a) Dilute waste sulphite liquor
　　　　　　　　　　cubic centimeters__ 1000
　Aniline _____grams__ 27.9
　Acetalydehyde _____do___ 6.6
　H₂SO₄ (1:1)_____cubic centimeters__ 20.0
(b) Dilute waste sulphite liquor
　　　　　　　　　　cubic centimeters__ 1000
　Aniline _____grams__ 27.9
　Acetaldehyde _____do___ 13.2
　H₂SO₄ (1:1)_____cubic centimeters__ 20.0
(c) Dilute waste sulphite liquor
　　　　　　　　　　cubic centimeters__ 1000
　Phenylenediamine _____grams__ 21.6
　Acetaldehyde _____do___ 17.6
　Conc. HCl_____cubic centimeters   20.0
(d) Dilute waste sulphite liquor
　　　　　　　　　　cubic centimeters__ 1000
　Para phenylenediamine_____grams__ 21.6
　Conc. HCl_____cubic centimeters   20.0
　Acetaldehyde _____grams__ 17.6

(e) Dilute waste sulphite liquor
------cubic centimeters-- 1000
Para phenylenediamine------grams-- 21.6
Conc. HCl------cubic centimeters 20.0
Acetaldehyde------grams-- 8.8
(f) Dilute waste sulphite liquor
------cubic centimeters-- 1000
Tolidine------grams-- 21.2
Conc. HCl------cubic centimeters 20.0
Acetaldehyde------grams-- 8.8
(g) Dilute waste sulphite liquor
------cubic centimeters-- 1000
α-naphthylamine------grams-- 28.6
Acetaldehyde------do--- 8.8
Conc. HCl------cubic centimeters-- 20.0

EXAMPLE V

Furfural reaction products (a) Dilute waste sulphite liquor
------cubic centimeters-- 1000
m-Phenylenediamine------grams-- 21.6
Furfural------do--- 42.7
Conc. HCl------cubic centimeters-- 20.0

(b) Dilute waste sulphite liquor
------cubic centimeters-- 1000
m-Phenylenediamine------grams-- 21.6
Furfural------do--- 21.3
Conc. HCl------cubic centimeters-- 20.0

(c) Dilute waste sulphite liquor
------cubic centimeters-- 1000
2, 4 toluylenediamine------grams-- 24.4
Furfural------do--- 42.7
Conc. HCl------cubic centimeters-- 20.0

(d) Dilute waste sulphite liquor
------cubic centimeters-- 1000
Benzidine------grams-- 18.4
Furfural------do--- 21.3
Conc. HCl------cubic centimeters-- 20.0

(e) Dilute waste sulphite liquor
------cubic centimeters-- 1000
α-naphthylamine------grams-- 28.6
Furfural------do--- 10.7
Conc. HCl------cubic centimeters-- 20.0

EXAMPLE VI

Mixed aldehyde reaction products (a) Dilute waste sulphite liquor
------cubic centimeters-- 1000
Aniline------grams-- 27.9
Acetaldehyde------do--- 13.2
Formalin------do--- 11.3
H₂SO₄ (1:1)------cubic centimeters 20.0

(b) Dilute waste sulphite liquor
------cubic centimeters-- 1000
Aniline------grams-- 20
Formalin------cubic centimeters-- 15
Furfural------cubic centimeters-- 25
H₂SO₄ (1:1)------cubic centimeters-- 15

(c) Dilute waste sulphite liquor
------cubic centimeters-- 1000
o-Toluidine------grams-- 21.4
Acetaldehyde------do--- 8.8
Formalin------do--- 11.3
H₂SO₄ (1:1)------cubic centimeters-- 15.0

(d) Dilute waste sulphite liquor
------cubic centimeters-- 1000
Para toluidine------grams-- 21.4
Acetaldehyde------do--- 8.8
Formalin------do--- 11.3
Conc. HCl------cubic centimeters-- 20.0

(e) Dilute waste sulphite liquor
------cubic centimeters-- 1000
Xylidine------grams-- 24.7
Acetaldehyde------do--- 8.8
Formalin------do--- 11.3
Conc. HCl------cubic centimeters-- 20.0

(f) Dilute waste sulphite liquor
------cubic centimeters-- 1000
m-Phenylenediamine------grams-- 21.6
Conc. HCl------cubic centimeters-- 20.0
Acetaldehyde------grams-- 8.8
Formalin------do--- 15.0

EXAMPLE VII

Mixed amine reaction products (a) Dilute waste sulphite liquor
------cubic centimeters-- 1000
Aniline------grams-- 18.6
Phenyl-b-naphthylamine------do--- 21.9
Conc. HCl------cubic centimeters-- 20.0
Formalin------grams-- 22.5

(b) Dilute waste sulphite liquor
------cubic centimeters-- 1000
Aniline------grams-- 18.6
o-Toluidine------do--- 21.4
Formalin------do--- 30.0
H₂SO₄ (1:1)------cubic centimeters 20.0

EXAMPLE VIII

Mixed aldehydes and mixed amine reaction products (a) Dilute sulphite waste liquor
------cubic centimeters-- 1000
Aniline------grams-- 18.6
o-Toluidine------do--- 21.4
H₂SO₄ (1:1)------cubic centimeters 20.0
Acetaldehyde------grams-- 8.8
Formalin------do--- 15.0

The present invention also includes the process and products resulting therefrom in which the spent sulphite liquor has been subjected to a chlorine gassing treatment prior to precipitation. The precipitates obtained from the sulphite liquor which have been subjected to the preliminary chlorine gas treatment have low ash values, i. e. around 0.1 percent, compared with ash values of the precipitates obtained from the raw or untreated pulping liquor which range from about 4–5 percent. My investigations have shown that the precipitates having a low ash value and obtained from chlorinated sulphite liquor exhibit better moldability than do the the precipitates obtained from the ordinary untreated liquor. The following example will serve for illustrative purposes:

EXAMPLE IX

About 13 grams of chlorine gas are blown into about 1000 c. c. of dilute spent or waste sulphite liquor. The amine, aldehyde and mineral acids are then added and the reaction carried out in accordance with Examples I or II.

A resinous precipitate with a low ash value may also be obtained from sulphite liquor when the waste sulphite liquor is subjected to a preliminary treatment which includes the following steps: addition of milk of lime to the spent sulphite liquor, separation of the liquor from the precipitate formed on addition of the milk of lime, addition of sulfuric acid to the liquor and separation of the liquor from the precipitate formed on the addition of the acid. This liquor substantially free from lime salts, yields an amine-aldehyde precipitate of improved molding properties. The low ash precipitates obtained from the treated sulphite liquors in accordance with the present invention are also readily filterable or separable and may be dried in the usual manner, e. g. in hot air, etc.

The resinous products of the present invention are obtainable at a very low cost and may serve as the principal ingredient in molding powders for making plastics, etc. Fillers such as wood filler are ordinarily mixed with the powdered precipitates and the mixture shaped under heat and pressure of around 125°–160° C. and 2000–4000 lbs. per square inch for about 3–15 minutes. The plastics after cooling have a resin-like appearance and exhibit remarkable strength, toughness and shock resistance. I have found that the addition to the molding powders of a small amount of flux or plasticizer such as glycerol, cresol, acetone, furfural, aniline, hexamethylenetetramine, anhydroformaldehyde aniline, and the like to increase fluidity to be desirable in practice. The addition of hexamethylenetetramine has also been found to decrease corrosive action during molding. My investigations have also shown the addition to the molding mixture of a small amount of insoluble soap such as zinc stearate aluminum palmitate, etc. provides a lubricating film which prevents the plastic from sticking to the mold.

I have discovered when hydrochloric acid e. g. crude muriatic acid, is used in place of sulphuric acid in the above examples, that the resulting resinous precipitates have a very low ash content. I have also discovered that improved molding compositions may be prepared by employing dilute sulphite liquor having dispersed therein a filler such as wood flour, groundwood, sulphite pulp etc. The formation and precipitation of the resinous precipitate in the presence of the filling material gives an intimate mixture of resin and filler, resulting in molding powders of superior molding properties.

In the preparation of the plastic material from both hard and soft wood dilute sulphite liquors, it is possible to obtain satisfactory results by varying the order of addition of the chemicals, the temperature, the concentration and by the axidation, acidification, alkalinization or halogenization of the spent liquors. In addition, the precipitates may be modified by the addition of other inorganic and organic materials to the reaction liquor. The preferred procedures may be found by experimental tests. The process described above gives a substantially complete precipitation of the desired resinous composition, the resulting precipitates being readily separable from the liquor, both of which are essential in a commercially practical process.

I claim:

1. The process of precipitating resinous compositions from spent sulphite liquor which comprises mixing a primary aromatic amine and an aldehyde with dilute sulphite liquor in the presence of a strong acid.

2. The process of preparing a resinous precipitate adaptable for use in molding powders, which comprises precipitating the resinous composition contained in spent acid sulphite liquor by mixing a primary aromatic amine, an aldehyde and a mineral acid with dilute sulphite liquor, separating the precipitate thus formed from the liquor, washing the precipitate and drying the precipitate.

3. The process of precipitating resinous compositions from spent sulphite liquor which comprises mixing a primary aromatic amine and formaldehyde with dilute sulphite liquor in the presence of a strong acid.

4. The process of precipitating resinous compositions from spent sulphite liquor which comprises mixing aniline and formaldehyde with dilute sulphite liquor in the presence of a strong acid.

5. The process of precipitating resinous compositions from spent sulphite liquor which comprises mixing toluidine and formaldehyde with dilute sulphite liquor in the presence of a strong acid.

6. The process of precipitating resinous compositions from spent sulphite liquor which comprises mixing aniline and formaldehyde with dilute sulphite liquor in the presence of sulphuric acid.

7. The process of precipitating resinous compositions from spent sulphite liquor which comprises mixing o-toluidine and formaldehyde with dilute sulphite liquor in the presence of hydrochloric acid.

8. A resinous precipitate of the type described comprising the reaction product of dilute spent acid sulphite liquor, a primary aromatic amine, an aldehyde and a mineral acid.

9. A resinous precipitate of the type described comprising the reaction product of dilute spent sulphite liquor, a primary aromatic amine, formaldehyde and a strong acid.

10. A resinous precipitate of the type described comprising the reaction product of dilute spent sulphite liquor, aniline, formaldehyde and a strong acid.

11. A resinous precipitate of the type described comprising the reaction product of dilute spent sulphite liquor, toluidine, formaldehyde and a strong acid.

12. A resinous precipitate of the type described comprising the reaction product of dilute spent sulphite liquor, aniline, formaldehyde and sulfuric acid.

13. A resinous precipitate of the type described comprising the reaction product of dilute spent sulphite liquor, o-toluidine, formaldehyde and a mineral acid.

14. A molding powder containing a low ash value resinous precipitate of the type described comprising a primary aromatic amine-aldehyde-mineral acid-dilute spent sulphite liquor reaction product, the ash value of said resinous precipitate being about 0.1 per cent.

15. A plastic comprising a reaction product of a primary aromatic amine, an aldehyde and dilute spent sulphite liquor containing a strong acid.

16. A plastic comprising a reaction product of a primary aromatic amine, formaldehyde and a mineral acid with dilute spent sulphite liquor.

17. A molded product containing a filler and the primary aromatic amine-aldehyde-strong acid-dilute spent sulphite liquor resinous precipitate of the type described.

HANS JOHN.